(12) United States Patent
Kubota

(10) Patent No.: US 10,539,208 B2
(45) Date of Patent: Jan. 21, 2020

(54) POWER TRAIN AND MOTOR GRADER

(71) Applicant: KOMATSU LTD., Tokyo (JP)

(72) Inventor: Teruya Kubota, Komatsu (JP)

(73) Assignee: KOMATSU LTD., Tokyo (JP)

( * ) Notice: Subject to any disclaimer, the term of this patent is extended or adjusted under 35 U.S.C. 154(b) by 155 days.

(21) Appl. No.: 15/570,394

(22) PCT Filed: Apr. 25, 2016

(86) PCT No.: PCT/JP2016/062905
§ 371 (c)(1),
(2) Date: Oct. 30, 2017

(87) PCT Pub. No.: WO2016/178382
PCT Pub. Date: Nov. 10, 2016

(65) Prior Publication Data
US 2018/0149240 A1  May 31, 2018

(30) Foreign Application Priority Data

May 7, 2015 (JP) ................................. 2015-094768

(51) Int. Cl.
*F16H 3/66* (2006.01)
*E02F 9/02* (2006.01)
*B60K 17/04* (2006.01)
*B60K 17/08* (2006.01)
*B60K 17/10* (2006.01)
(Continued)

(52) U.S. Cl.
CPC ............. *F16H 3/66* (2013.01); *B60K 17/046* (2013.01); *B60K 17/08* (2013.01); *B60K 17/10* (2013.01); *E02F 9/02* (2013.01); *F16H 47/04* (2013.01); *E02F 3/7636* (2013.01);
(Continued)

(58) Field of Classification Search
CPC . B60B 35/125; F16H 3/66; F16H 2200/2007; F16H 2200/2033; F16H 47/04; B60K 17/046; B60K 17/08; B60K 17/10; E02F 9/02; E02F 9/2079; E02F 9/2253; E02F 3/7636; B60Y 2200/411
See application file for complete search history.

(56) References Cited

U.S. PATENT DOCUMENTS 5,391,123 A * 2/1995 Forster ................ B60K 7/0015
475/83
5,820,506 A 10/1998 Mann
(Continued)

FOREIGN PATENT DOCUMENTS

CN 1172455 A 2/1998
CN 102667242 A 9/2012
(Continued)

*Primary Examiner* — Jacob S. Scott
*Assistant Examiner* — Lori Wu
(74) *Attorney, Agent, or Firm* — Drinker Biddle & Reath LLP

(57) ABSTRACT

A power train is provided having a reduced size and weight. A hydraulic motor includes a rotatable output shaft. Wheel bearings rotatably support a rotatable housing relative to a motor housing. A hydraulic clutch mechanism permits or prohibits rotation of a second carrier of a second planetary gear reducer about the center of rotation of the output shaft. The hydraulic clutch mechanism is disposed on the radially inner side relative to the wheel bearings.

6 Claims, 7 Drawing Sheets

(51) Int. Cl.
  *F16H 47/04* (2006.01)
  *E02F 3/76* (2006.01)
  *F16D 25/0638* (2006.01)

(52) U.S. Cl.
  CPC .. *F16D 25/0638* (2013.01); *F16H 2200/2007* (2013.01); *F16H 2200/2033* (2013.01)

(56) References Cited

U.S. PATENT DOCUMENTS

| | | |
|---|---|---|
| 6,491,600 B1 | 12/2002 | Smemo et al. |
| 2002/0045510 A1 | 4/2002 | Damm et al. |
| 2012/0149520 A1 | 6/2012 | Schneidewind et al. |
| 2012/0196715 A1* | 8/2012 | Turner ................ B60K 17/046 |
| | | 475/159 |
| 2012/0202640 A1 | 8/2012 | Morimoto |
| 2015/0273940 A1* | 10/2015 | Forrest ..................... F16H 1/46 |
| | | 475/300 |

FOREIGN PATENT DOCUMENTS

| | | | |
|---|---|---|---|
| CN | 103261737 A | 8/2013 | |
| DE | 10030441 A1 | 1/2002 | |
| DE | 10103726 A1 * | 8/2002 | ........... B60K 17/046 |
| JP | S63-76940 A | 4/1988 | |
| JP | 2011-106611 A | 6/2011 | |
| JP | 5306971 B2 | 10/2013 | |

* cited by examiner

POWER TRAIN AND MOTOR GRADER

TECHNICAL FIELD

The present invention relates to a power train and a motor grader including the power train.

BACKGROUND ART

Some motor graders, for example, in recent years are provided with an all-wheel drive device for driving all of the front and rear wheels. Such an all-wheel drive device transfers engine output to rear wheels through a transmission so as to drive the rear wheels, and also transfers engine output to a hydraulic pump so as to drive each of right and left front wheels using corresponding one of paired hydraulic motors rotatable with discharged oil from the hydraulic pump.

Japanese Patent Laying-Open No. 2011-106611 (PTD 1) discloses a configuration of a power train including a hydraulic motor, a first planetary gear reducer, and a second planetary gear reducer, the power train being configured to transfer a torque of the hydraulic motor to a wheel through the two-stage planetary gear reducer, where a hydraulic clutch mechanism is coupled to a carrier of the second planetary gear reducer so as to prohibit or permit rotation of the carrier.

CITATION LIST

Patent Document

PTD 1: Japanese Patent Laying-Open No. 2011-106611

SUMMARY OF INVENTION

Technical Problem

In the power train described in PTD 1, the hydraulic clutch mechanism is large in diameter, which makes it difficult for the power train to have a reduced size and weight.

An object of the present invention is to provide a power train having a reduced size and weight, and to provide a motor grader including the power train.

Solution to Problem

A power train according to the present invention includes a hydraulic motor, a motor housing, a rotatable housing, a bearing, a first planetary gear reducer, a second planetary gear reducer, and a clutch. The hydraulic motor includes a rotatable output shaft. The motor housing houses the hydraulic motor. The rotatable housing is rotatable relative to the motor housing about the center of rotation of the output shaft. The bearing rotatably supports the rotatable housing relative to the motor housing. The first planetary gear reducer includes a first sun gear to which a torque is input from the hydraulic motor, a plurality of first planetary gears engaged with the first sun gear, a first carrier rotatably supporting the plurality of first planetary gears, and a first ring gear provided in the rotatable housing, the first ring gear being engaged with the plurality of first planetary gears. The second planetary gear reducer includes a second sun gear coupled to the first carrier, a plurality of second planetary gears engaged with the second sun gear, a second carrier rotatably supporting the plurality of second planetary gears, and a second ring gear provided in the rotatable housing, the second ring gear being engaged with the plurality of second planetary gears. The clutch permits or prohibits rotation of the second carrier about the center of rotation of the output shaft. The clutch is disposed on the radially inner side relative to the bearing.

According to the power train of the present invention, the diameter of a clutch can be reduced, and thus the external dimension of the power train in the radial direction can be reduced.

In the above-described power train, viewed in the axial direction of the output shaft, the first planetary gear reducer and the clutch overlap with each other. Defining the position of the clutch relative to the first planetary gear reducer in this way can reliably provide a structure in which the clutch is disposed on the radially inner side relative to the bearing.

In the above-described power train, the hydraulic motor includes a main body supporting the output shaft. The clutch surrounds the main body of the hydraulic motor. Disposing the clutch between the main body of the hydraulic motor and the bearing in the radial direction can more reliably provide a structure in which the clutch is disposed on the radially inner side relative to the bearing.

In the above-described power train, the main body is symmetrical in shape with respect to the center of rotation of the output shaft. The inner diameter of the clutch is smaller than the maximum diameter of the main body. Disposing the clutch closer to the hydraulic motor and reducing the inner diameter of the clutch can reliably provide a structure in which the clutch is disposed on the radially inner side relative to the bearing.

In the above-described power train, the clutch includes clutch plates and fixed plates alternately disposed in the axial direction of the output shaft. The fixed plates are attached to the motor housing. This allows for a simple structure of the power train without the need for a clutch housing, and thus can reliably achieve reduction in size and weight of the power train.

The above-described power train further includes an input shaft. The input shaft is coupled to the hydraulic motor to input a torque from the hydraulic motor to the first sun gear. In the axial direction of the output shaft, the clutch is disposed closer to the hydraulic motor than the input shaft is. By defining the position of the clutch relative to the input shaft in this way, the clutch does not interfere with the first and second planetary gear reducers. Thus, the overall structure of the first and second planetary gear reducers can be reduced in outer diameter, and the power train can be reduced in weight.

A motor grader according to the present invention includes front wheels and any of the above-described power trains configured to transfer power to the front wheels. Thus, front wheels of the motor grader can be reduced in weight.

Advantageous Effects of Invention

A power train of the present invention can achieve a reduced size and weight.

DESCRIPTION OF EMBODIMENTS

An embodiment of the present invention is described below with reference to the drawings.

A configuration of a motor grader is described as an example of a work vehicle to which the concept of the present invention is applicable. The present invention, however, is applicable to various other types of work vehicle including a power train configured to be switchable between an on-state and an off-state of drive.

Figure 1:
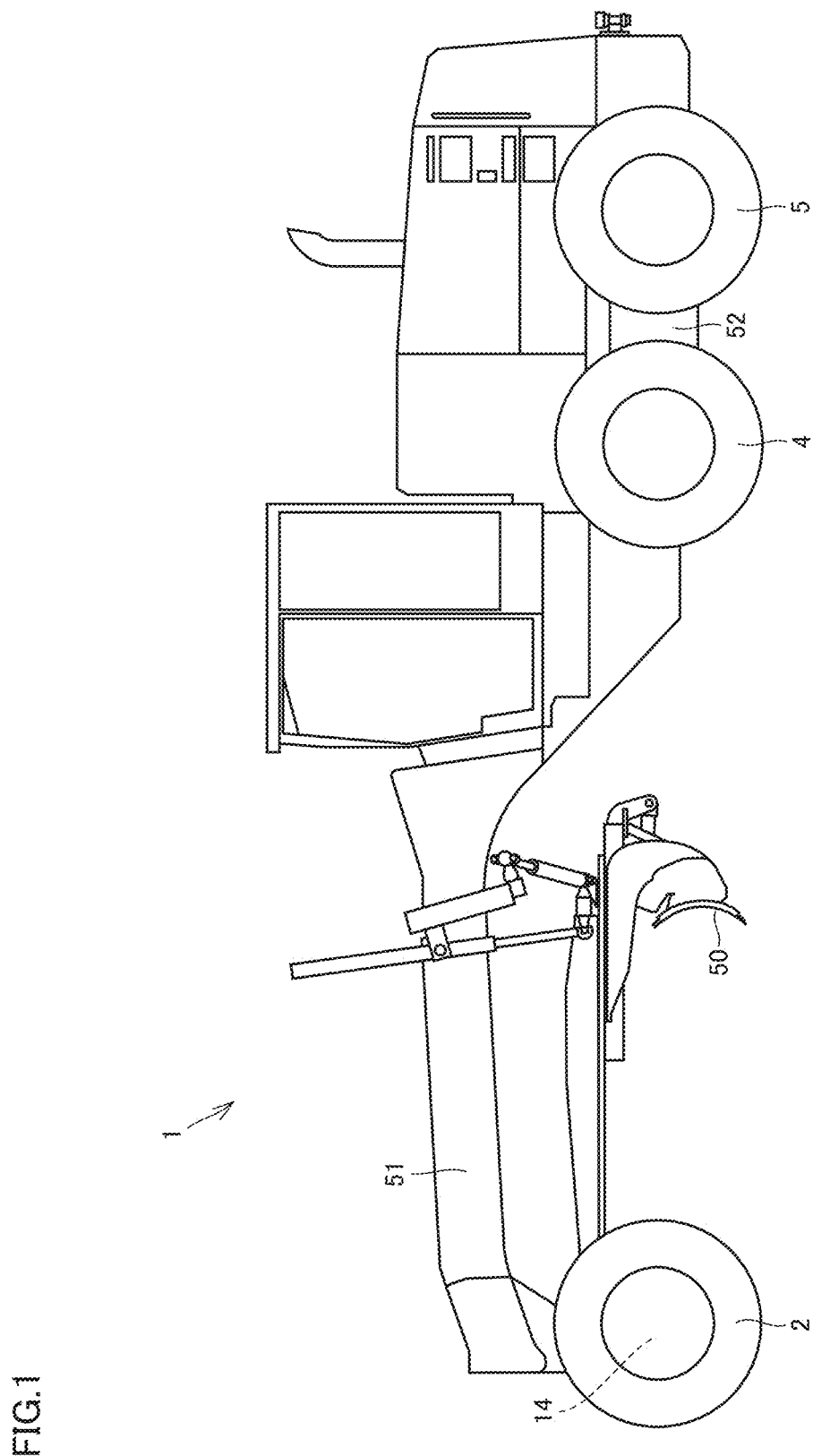
FIG. 1 is a side view schematically showing a configuration of a motor grader according to an embodiment of the present invention.

FIG. 1 is a side view schematically showing a configuration of a motor grader 1 according to an embodiment of the present invention. As shown in FIG. 1, motor grader 1 of the present embodiment is a vehicle having six wheels in total. Motor grader 1 is provided with travel wheels including a pair of right and left front wheels and two rear wheels on each side. The front wheels include a left front wheel 2 and a right front wheel which is not shown in FIG. 1. The rear wheels include a front-left rear wheel 4 and a rear-left rear wheel 5. The rear wheels also include a front-right rear wheel and a rear-right rear wheel which are not shown in FIG. 1. The number and the arrangement of the front wheels and the rear wheels are not limited to the example shown in FIG. 1.

Motor grader 1 includes a blade 50. Blade 50 is provided between the front wheels and the rear wheels. Motor grader 1 can perform works, such as ground leveling, snow removal, light cutting, and mixing of ingredients, with blade 50.

Motor grader 1 includes a body frame. The body frame includes a front frame 51 and a rear frame 52. Front frame 51 is pivotably coupled to rear frame 52.

The front wheels are provided on front frame 51 together with blade 50. The front wheels are rotatably attached to the front end of front frame 51. The rear wheels are provided on rear frame 52. The rear wheels are attached to rear frame 52 in such a way as to be rotary-driven with a driving force from an engine, as described later.

Figure 2:
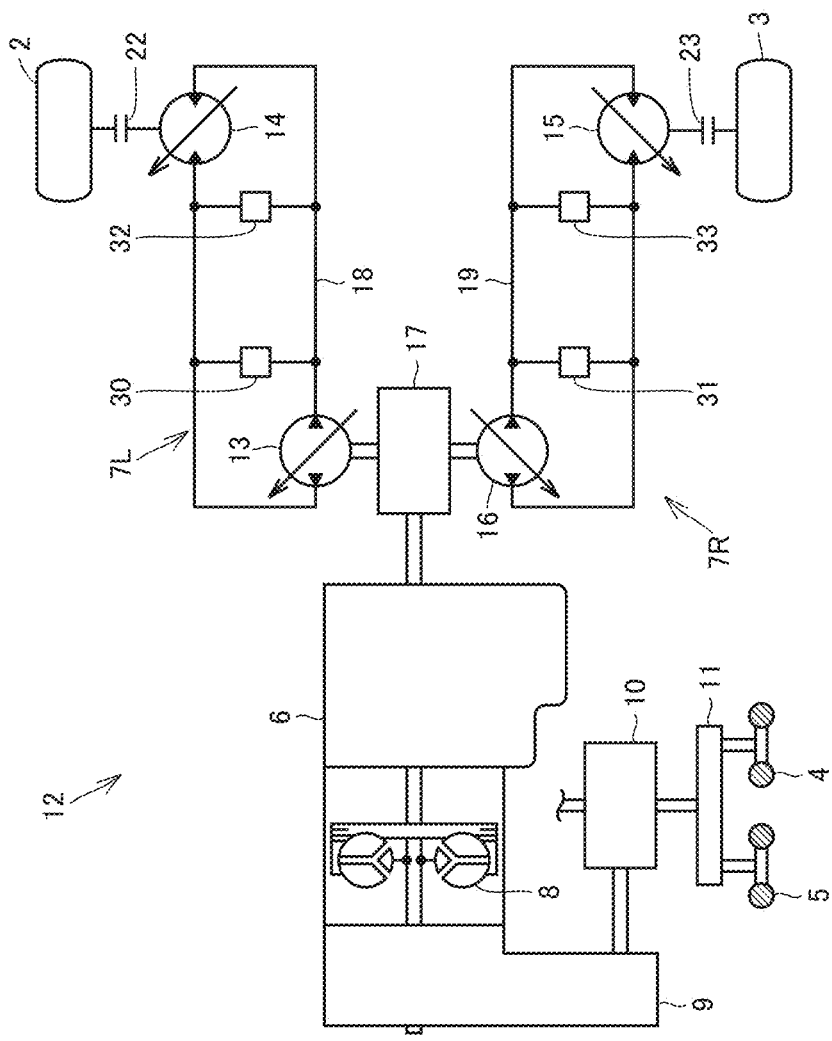
FIG. 2 is a configuration diagram showing a schematic configuration of the motor grader shown in FIG. 1.

FIG. 2 is a configuration diagram showing a schematic configuration of motor grader 1 shown in FIG. 1. A pair of right and left front wheels described above includes a left front wheel 2 and a right front wheel 3. Motor grader 1 includes an engine 6. Engine 6 is supported by rear frame 52 shown in FIG. 1.

To one output side of engine 6, hydraulic systems 7L, 7R are connected. Hydraulic system 7L drives left front wheel 2. Hydraulic system 7R drives right front wheel 3. To the other output side of engine 6, left rear wheels 4, 5 and right rear wheels which are paired with left rear wheels 4, 5 are connected through a torque converter 8, a transmission 9, a final reduction gear 10, and a tandem device 11. Engine 6 drives left rear wheels 4, 5 and right rear wheels through torque converter 8, transmission 9, final reduction gear 10, and tandem device 11.

Motor grader 1 is an all-wheel drive vehicle where front wheels 2, 3, left rear wheels 4, 5, and the right rear wheels are all driven by the devices 6 to 11 for power generation and transfer. The devices 6 to 11 constitute an all-wheel drive device 12. Most parts of all-wheel drive device 12 (engine 6, a part of hydraulic systems 7L, 7R, torque converter 8, transmission 9, and final reduction gear 10) are supported by rear frame 52.

Hydraulic system 7L includes a left hydraulic pump 13 and a left hydraulic motor 14. Hydraulic system 7R includes a right hydraulic pump 16 and a right hydraulic motor 15. Left hydraulic pump 13 and right hydraulic pump 16 are driven with the output of engine 6 transferred through a power take-off (PTO) 17. Left hydraulic motor 14 is rotated with hydraulic oil discharged from left hydraulic pump 13 to drive left front wheel 2. Right hydraulic motor 15 is rotated with hydraulic oil discharged from right hydraulic pump 16 to drive right front wheel 3. Hydraulic motors 14, 15 are bent axis motors in the present embodiment.

Left hydraulic pump 13 and left hydraulic motor 14 are connected to each other with a left hydraulic circuit 18. Hydraulic oil discharged from left hydraulic pump 13 is supplied to left hydraulic motor 14 through left hydraulic circuit 18. The speed of rotation of left front wheel 2 when being driven is controlled with hydraulic oil discharged from left hydraulic pump 13.

Left hydraulic circuit 18 is provided with a relief valve 30 and a flushing valve 32. Relief valve 30 is provided so as to prevent an excessive increase in pressure of hydraulic oil in left hydraulic circuit 18. Flushing valve 32 is provided so as to discharge surplus oil.

Right hydraulic pump 16 and right hydraulic motor 15 are connected to each other with a right hydraulic circuit 19. Hydraulic oil discharged from right hydraulic pump 16 is supplied to right hydraulic motor 15 through right hydraulic circuit 19. The speed of rotation of right front wheel 3 when being driven is controlled with hydraulic oil discharged from right hydraulic pump 16.

Right hydraulic circuit 19 is provided with a relief valve 31 and a flushing valve 33. Relief valve 31 is provided so as to prevent an excessive increase in pressure of hydraulic oil in right hydraulic circuit 19. Flushing valve 33 is provided so as to discharge surplus oil.

A left hydraulic clutch mechanism 22 is provided between left front wheel 2 and left hydraulic motor 14. Right hydraulic clutch mechanism 23 is provided between right front wheel 3 and right hydraulic motor 15. Supply of an oil pressure to left hydraulic clutch mechanism 22 and right hydraulic clutch mechanism 23 causes power to be transferred to left front wheel 2 and right front wheel 3, thus causing motor grader 1 to perform all-wheel drive. Blocking supply of oil pressure to left hydraulic clutch mechanism 22 and right hydraulic clutch mechanism 23 causes motor grader 1 to stop all-wheel drive and to perform rear-wheel drive.

Figure 3:
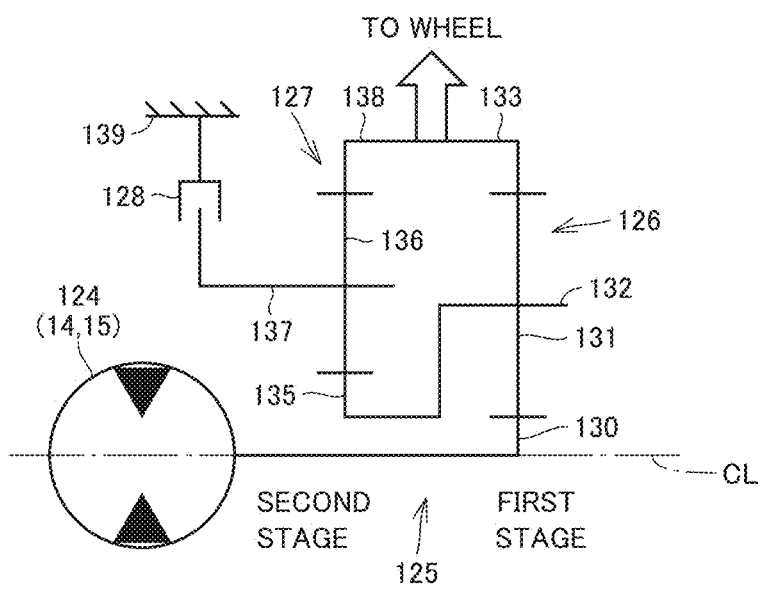
FIG. 3 is a schematic diagram of a power train according to an embodiment of the present invention.

FIG. 3 is a schematic diagram of a power train 125 according to an embodiment of the present invention. Power train 125 is a device for transferring power of a hydraulic motor 124 as a drive source (equivalent to hydraulic motors 14, 15 shown in FIG. 2) to a wheel (equivalent to front wheels 2, 3 shown in FIG. 2). Power train 125 includes a first planetary gear reducer 126, a second planetary gear reducer 127, and a hydraulic clutch mechanism 128 (equivalent to hydraulic clutch mechanisms 22, 23 shown in FIG. 2). The dot-and-dash line shown in FIG. 3 represents a central line CL, which is the center of rotation of rotating objects included in power train 125.

First planetary gear reducer 126 includes a first sun gear 130, a plurality of first planetary gears 131, a first carrier 132, and a first ring gear 133. Second planetary gear reducer 127 includes a second sun gear 135, a plurality of second planetary gears 136, a second carrier 137, and a second ring gear 138.

In power train 125, a torque from hydraulic motor 124 is input to first sun gear 130. First carrier 132 is coupled to second sun gear 135. First ring gear 133 is coupled to second ring gear 138. Both ring gears 133, 138 are coupled to the wheel. Second carrier 137 is coupled to a fixation housing 139 through hydraulic clutch mechanism 128.

Figure 4:
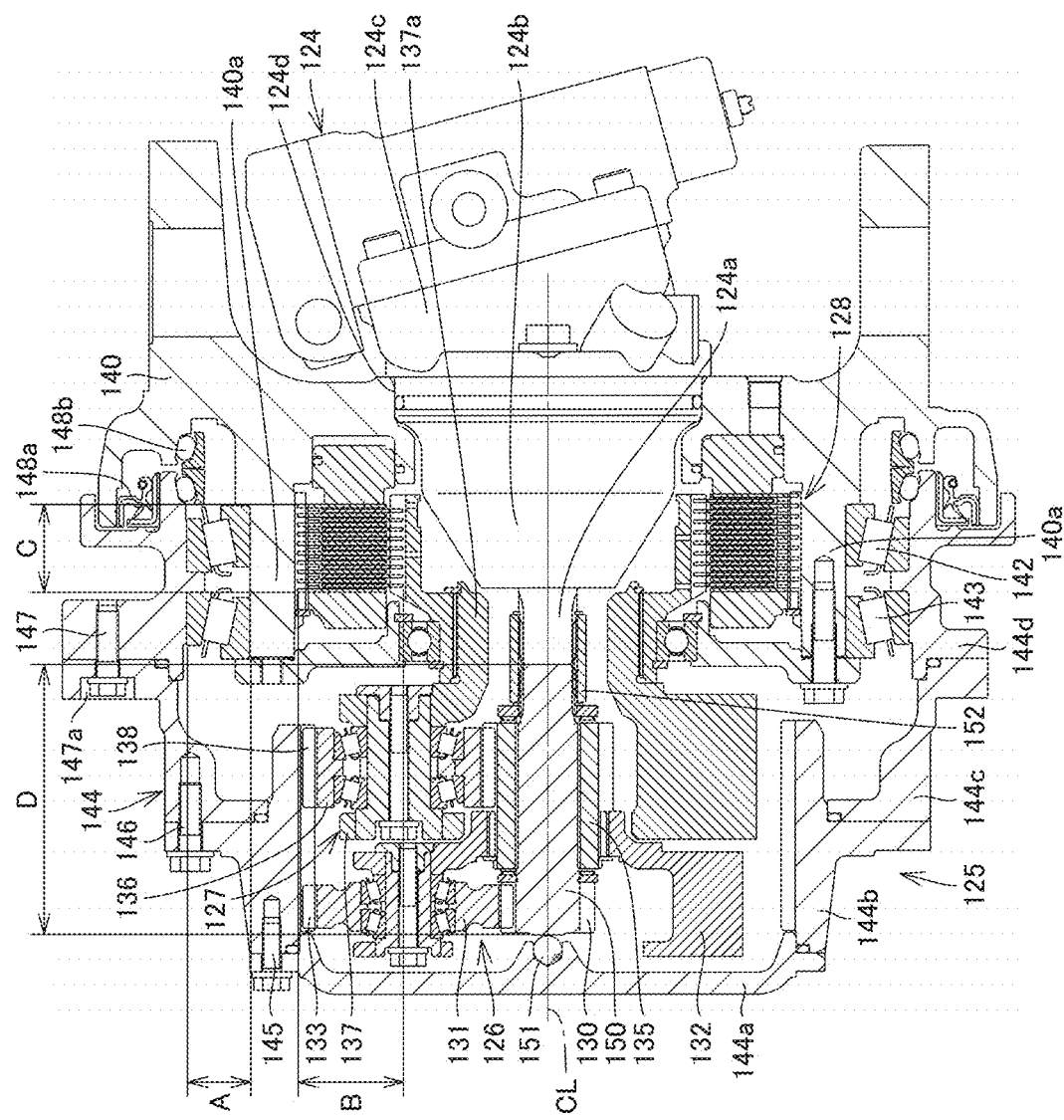
FIG. 4 is an overall cross-sectional configuration diagram of a power train according to an embodiment of the present invention.

FIG. 4 is an overall cross-sectional configuration diagram of power train 125 according to an embodiment of the present invention. As shown in FIG. 4, hydraulic motor 124 is housed in a motor housing 140 on the vehicle-body inner side (the right side in FIG. 4). Hydraulic motor 124 includes a rotatable output shaft 124a and a main body 124b. Output shaft 124a protrudes from main body 124b to the vehicle-body outer side (the left side in FIG. 4). The dot-and-dash line shown in FIG. 4 represents central line CL, which is the center of rotation of rotating objects, such as output shaft 124a of hydraulic motor 124, as in FIG. 3. Output shaft 124a is disposed coaxially with a rotating shaft of the wheel. Motor housing 140 includes a protrusion 140a protruding to the vehicle-body outer side.

Power train 125 includes a rotatable housing 144. In rotatable housing 144, first planetary gear reducer 126, second planetary gear reducer 127, and hydraulic clutch mechanism 128 are housed. First planetary gear reducer 126 and second planetary gear reducer 127 are aligned in the axial direction of output shaft 124a (the direction in which central line CL extends, i.e., the right-left direction in FIG. 4). Rotatable housing 144 is provided rotatably relative to motor housing 140 about central line CL. Rotatable housing 144 has a bowl shape open toward motor housing 140.

Rotatable housing 144 includes a first case portion 144a, a second case portion 144b, a third case portion 144c, and a fourth case portion 144d. First case portion 144a is substantially disk-shaped and forms the bottom of the bowl shape. Second case portion 144b, third case portion 144c, and fourth case portion 144d each have a ring shape and form the lateral of the bowl shape.

First case portion 144a and second case portion 144b are fixed to each other with a bolt 145. Second case portion 144b and third case portion 144c are fixed to each other with a bolt 146. Third case portion 144c and fourth case portion 144d are fixed to each other with a bolt 147.

Between rotatable housing 144 (fourth case portion 144d) and motor housing 140, an oil seal 148a and a floating seal 148b are provided. Oil seal 148a and floating seal 148b are provided so as to prevent leakage of oil from the inside of rotatable housing 144 to the outside.

In third case portion 144c, a recess 147a is formed. Recess 147a is formed by a part of the outer surface of third case portion 144c being recessed. The head of bolt 147 is fitted in recess 147a.

A bolt (not shown) is screwed in fourth case portion 144d through a hole formed in third case portion 144c. With this bolt, the wheel (front wheels 2, 3 shown in FIG. 2) is attached to rotatable housing 144.

Two wheel bearings 142, 143 are disposed between protrusion 140a of motor housing 140 and fourth case portion 144d of rotatable housing 144 in the radial direction.

Rotatable housing 144 and the wheel are rotatably supported by protrusion 140a of motor housing 140 through two wheel bearings 142, 143.

Wheel bearings 142, 143 are disposed on the radially outer side relative to protrusion 140a of motor housing 140. The inner rings of wheel bearings 142, 143 are fixed to the outer periphery of protrusion 140a of motor housing 140. The outer rings of wheel bearings 142, 143 are fixed to the inner periphery of fourth case portion 144d of rotatable housing 144.

An input shaft 150 is disposed coaxially with output shaft 124a of hydraulic motor 124. Input shaft 150 is provided rotatably about central line CL. Input shaft 150 is disposed on the vehicle-body outer side relative to output shaft 124a of hydraulic motor 124. The edge face of output shaft 124a on the vehicle-body outer side and the edge face of input shaft 150 on the vehicle-body inner side face each other.

Output shaft 124a has spline grooves formed in the outer periphery thereof, near the end of output shaft 124a on the vehicle-body outer side. Input shaft 150 has spline grooves formed in the outer periphery thereof, near the end of input shaft 150 on the vehicle-body inner side. Output shaft 124a and input shaft 150 are coupled to each other with a spline cylinder 152. Spline cylinder 152 has spline teeth formed on the inner periphery thereof. The spline teeth are fitted in the spline grooves of output shaft 124a and the spline grooves of input shaft 150, so that input shaft 150 and output shaft 124a are coupled to each other so as to be integrally rotatable.

Figure 5:
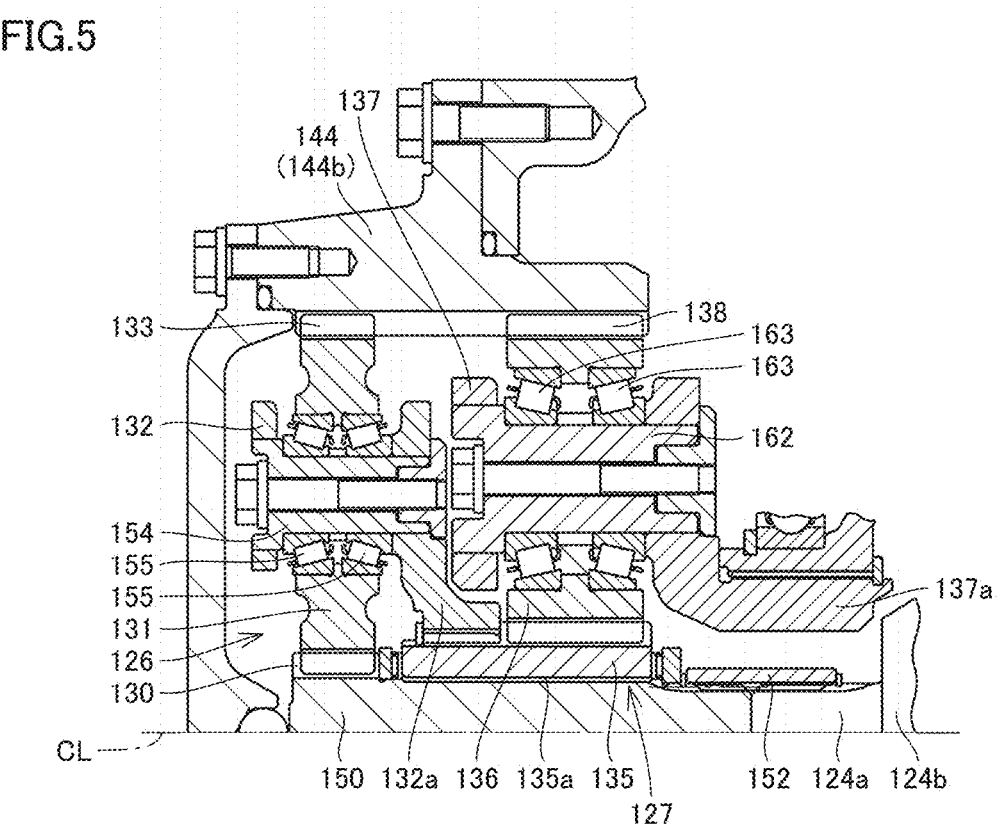
FIG. 5 is a cross-sectional configuration diagram of first and second planetary gear reducers of the power train shown in FIG. 4.

FIG. 5 is a cross-sectional configuration diagram of first planetary gear reducer 126 and second planetary gear reducer 127 of power train 125 shown in FIG. 4. As shown in FIG. 4 and FIG. 5, which is a view obtained by partially enlarging FIG. 4, first planetary gear reducer 126 is disposed remoter from hydraulic motor 124 than second planetary gear reducer 127 is. First planetary gear reducer 126 is disposed on the vehicle-body outer side relative to second planetary gear reducer 127. First planetary gear reducer 126 includes first sun gear 130, first planetary gears 131, first carrier 132, and first ring gear 133.

First sun gear 130 is formed integrally with input shaft 150. First sun gear 130 is formed at the end of input shaft 150 on the vehicle-body outer side. First sun gear 130 is rotatable integrally with input shaft 150. First sun gear 130 may be coupled to input shaft 150. Between the edge face of input shaft 150 on the vehicle-body outer side and rotatable housing 144 (first case portion 144a), a ball 151 is disposed. Ball 151 receives a thrust force from input shaft 150.

A plurality of first planetary gears 131 are rotatably supported by first carrier 132 and are engaged with first sun gear 130. First carrier 132 has a plurality of slits formed at predetermined intervals in the circumferential direction, the slits passing through first carrier 132 in the radial direction. At each slit, a corresponding first planetary gear 131 is disposed. First support pins 154 are provided each axially passing through a corresponding slit. Each first planetary gear 131 is rotatably supported by a corresponding first support pin 154 through two tapered roller bearings 155. At the inner periphery of first carrier 132 on the vehicle-body inner side, a coupling ring 132a that axially protrudes is formed. Coupling ring 132a has a plurality of teeth on the inner periphery thereof.

First ring gear 133 is provided at the inner periphery of rotatable housing 144 (second case portion 144b). First ring gear 133 is engaged with a plurality of first planetary gears 131.

Second planetary gear reducer 127 is disposed closer to the hydraulic motor 124 than first planetary gear reducer 126 is. Second planetary gear reducer 127 is disposed on the vehicle-body inner side relative to first planetary gear reducer 126. Second planetary gear reducer 127 includes second sun gear 135, second planetary gears 136, second carrier 137, and second ring gear 138.

Second sun gear 135 has a hole 135a axially passing through the center of second sun gear 135. Input shaft 150 passes through this hole 135a. A plurality of teeth are formed at a part of second sun gear 135 on the vehicle-body outer side. These teeth are engaged with a plurality of teeth of coupling ring 132a of first carrier 132. Second sun gear 135 is thus coupled to first carrier 132.

A plurality of second planetary gears 136 are rotatably supported by second carrier 137 and are engaged with the teeth formed at a part of second sun gear 135 on the vehicle-body inner side. Similarly to first carrier 132, second carrier 137 has a plurality of slits formed at predetermined intervals in the circumferential direction, the slits passing through second carrier 137 in the radial direction. At each slit, a corresponding second planetary gear 136 is disposed. Second support pins 162 are provided each axially passing through a corresponding slit. Each second planetary gear 136 is rotatably disposed at a corresponding second support pin 162 through two tapered roller bearings 163. At the end of the lateral outer periphery of second carrier 137 on the vehicle-body inner side, a coupling ring 137a that axially protrudes is formed.

Second ring gear 138 is provided at the inner periphery of rotatable housing 144 (second case portion 144b). Second ring gear 138 is engaged with a plurality of second planetary gears 136. First ring gear 133 and second ring gear 138 are formed at the same position in the radial direction. First ring gear 133 and second ring gear 138 have the same diameter.

Figure 6:
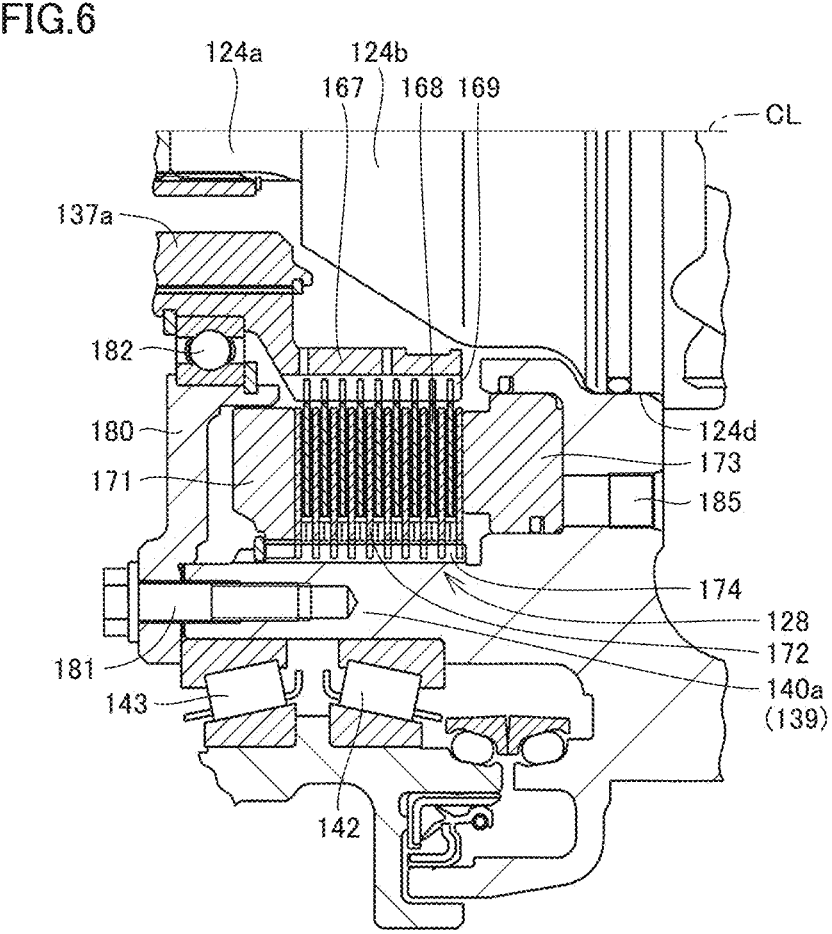
FIG. 6 is a cross-sectional configuration diagram of a hydraulic clutch mechanism of the power train shown in FIG. 4.

FIG. 6 is a cross-sectional configuration diagram of hydraulic clutch mechanism 128 of power train 125 shown in FIG. 4. Hydraulic clutch mechanism 128 is a mechanism that prohibits rotation of second carrier 137 about central line CL (i.e., transfers power) in an on-state, and permits rotation of second carrier 137 (i.e., stops the transfer) in an off-state.

As shown in FIG. 4 and FIG. 6, which is a view obtained by partially enlarging FIG. 4, hydraulic clutch mechanism 128 is constituted of a rotatable portion and a fixed portion. The rotatable portion includes a clutch input portion 167 and a plurality of (nine in this example) clutch plates 168. Clutch input portion 167 is coupled to coupling ring 137a formed at a part of second carrier 137 and is rotatable together with second carrier 137.

A plurality of clutch plates 168 each have a ring shape. Clutch input portion 167 has an engagement portion 169 formed on the outer periphery thereof. Each clutch plate 168 has an engagement portion formed on the inner periphery thereof, the engagement portion being engaged with engagement portion 169. To both faces of each clutch plate 168, a friction facing is attached. Clutch plates 168 are rotatable together with second carrier 137 and are axially movable along engagement portion 169 of clutch input portion 167.

The fixed portion of hydraulic clutch mechanism 128 includes a pressure plate 171, a plurality of (ten in this example) fixed plates 172, and a piston 173. The fixed portion is attached non-rotatably to motor housing 140.

A plurality of fixed plates 172 each have a ring shape. Protrusion 140a of motor housing 140 has an engagement portion 174 formed on the inner periphery of protrusion 140a. Each fixed plate 172 has an engagement portion formed on the outer periphery thereof, the engagement portion being engaged with engagement portion 174. Fixed plates 172 are thus attached to motor housing 140 non-rotatably and axially-movably relative to motor housing 140. Protrusion 140a of motor housing 140 serves as fixation housing 139 shown in FIG. 3.

Hydraulic clutch mechanism 128 is disposed on the radially inner side relative to protrusion 140a of motor housing 140. Wheel bearings 142, 143 described above are disposed on the radially outer side relative to protrusion 140a of motor housing 140. Hydraulic clutch mechanism 128 is thus disposed on the radially inner side relative to wheel bearings 142, 143.

Hydraulic clutch mechanism 128 is disposed on the radially outer side relative to clutch input portion 167. A part of clutch input portion 167 where hydraulic clutch mechanism 128 is attached has a substantially cylindrical shape. The inner periphery of the part of clutch input portion 167 faces main body 124b of hydraulic motor 124. Hydraulic clutch mechanism 128 is disposed on the radially outer side relative to main body 124b of hydraulic motor 124.

To the end of protrusion 140a of motor housing 140 on the vehicle-body outer side, a ring-shaped plate 180 is fixed with a bolt 181. Ring-shaped plate 180, near the outer periphery edge thereof, is fixed to protrusion 140a of motor housing 140. The inner periphery edge of ring-shaped plate 180 has a cylindrical shape. Between the inner periphery edge of ring-shaped plate 180 and clutch input portion 167, a ball bearing 182 is provided.

Pressure plate 171 is in the form of a ring. Pressure plate 171 is disposed between protrusion 140a of motor housing 140 and the inner periphery edge of ring-shaped plate 180 in the radial direction. Pressure plate 171 has an engagement portion formed on the outer periphery thereof, the engagement portion being engaged with engagement portion 174. A snap ring for limiting a movement of pressure plate 171 toward the vehicle-body outer side is provided on the vehicle-body outer side relative to pressure plate 171.

Clutch plates 168 and fixed plates 172 are alternately disposed in the axial direction along central line CL. Relative to the assembly of clutch plates 168 and fixed plates 172 alternately laid, piston 173 is disposed on the vehicle-body inner side, and pressure plate 171 is disposed on the vehicle-body outer side. Clutch plates 168 and fixed plates 172 are configured to be in pressure contact with each other between piston 173 and pressure plate 171.

In hydraulic clutch mechanism 128, the clutch is switched between an on-state and an off-state by actuating piston 173. In a state in which the clutch is ON (the break is ON), the rotatable portion of hydraulic clutch mechanism 128 is fixed and prohibited from rotating. In a state in which the clutch is OFF (the break is OFF), the rotatable portion of hydraulic clutch mechanism 128 is released and permitted to rotate.

Piston 173 is actuated with an oil pressure supplied from a control valve (not shown). A supply port 185 for supplying oil pressure is formed at motor housing 140, as shown in FIG. 6. Supply port 185 is formed along the axial direction at an intermediate portion of motor housing 140 in the radial direction. Supply port 185 allows communication between the outside (for example, the space in which hydraulic motor 124 is housed) and the chamber in which piston 173 is disposed. An oil pressure supplied from the control valve to supply port 185 acts on piston 173.

In power train 125 configured as above, supply of oil pressure to piston 173 causes clutch plates 168 and fixed plates 172 of hydraulic clutch mechanism 128 to come in pressure contact with each other, and thus causes the clutch to come to an on-state (causes the break to come to an on-state). Thus, rotation of second carrier 137 of second planetary gear reducer 127 is prohibited.

A torque is input from hydraulic motor 124 to first sun gear 130 through input shaft 150. A torque input to first sun gear 130 is transferred to first ring gear 133 through a plurality of first planetary gears 131. A torque from first carrier 132 is input to second sun gear 135. A torque input to second sun gear 135 is transferred to second ring gear 138 through a plurality of second planetary gears 136. A composition of a torque transferred to second ring gear 138 and a torque of first ring gear 133 is transferred to the wheel. The reaction force of a torque of second carrier 137 is received by fixation housing 139 through hydraulic clutch mechanism 128.

As described above, in power train 125, a composition of a torque input from hydraulic motor 124 and transferred by first planetary gear reducer 126 and a torque input from hydraulic motor 124 and transferred by second planetary gear reducer 127 is transferred to the wheel.

Hydraulic clutch mechanism 128 comes to an off-state by stopping supply of oil pressure to piston 173 and discharging pressure oil. When hydraulic clutch mechanism 128 is OFF (the break is OFF), rotation of second carrier 137 of second planetary gear reducer 127 is permitted. Accordingly, if a torque is input from hydraulic motor 124, second carrier 137 rotates and second planetary gears 136 both rotate and revolute. Therefore, no torque is transferred to the wheel from either first planetary gear reducer 126 or second planetary gear reducer 127.

In FIG. 4, hydraulic clutch mechanism 128 on the lower side relative to central line CL where supply port 185 is shown is in an off-state in which an oil pressure is not supplied to piston 173. In FIG. 4, hydraulic clutch mechanism 128 on the upper side relative to central line CL where supply port 185 is not shown is in an on-state in which an oil pressure is supplied to piston 173.

Figure 7:
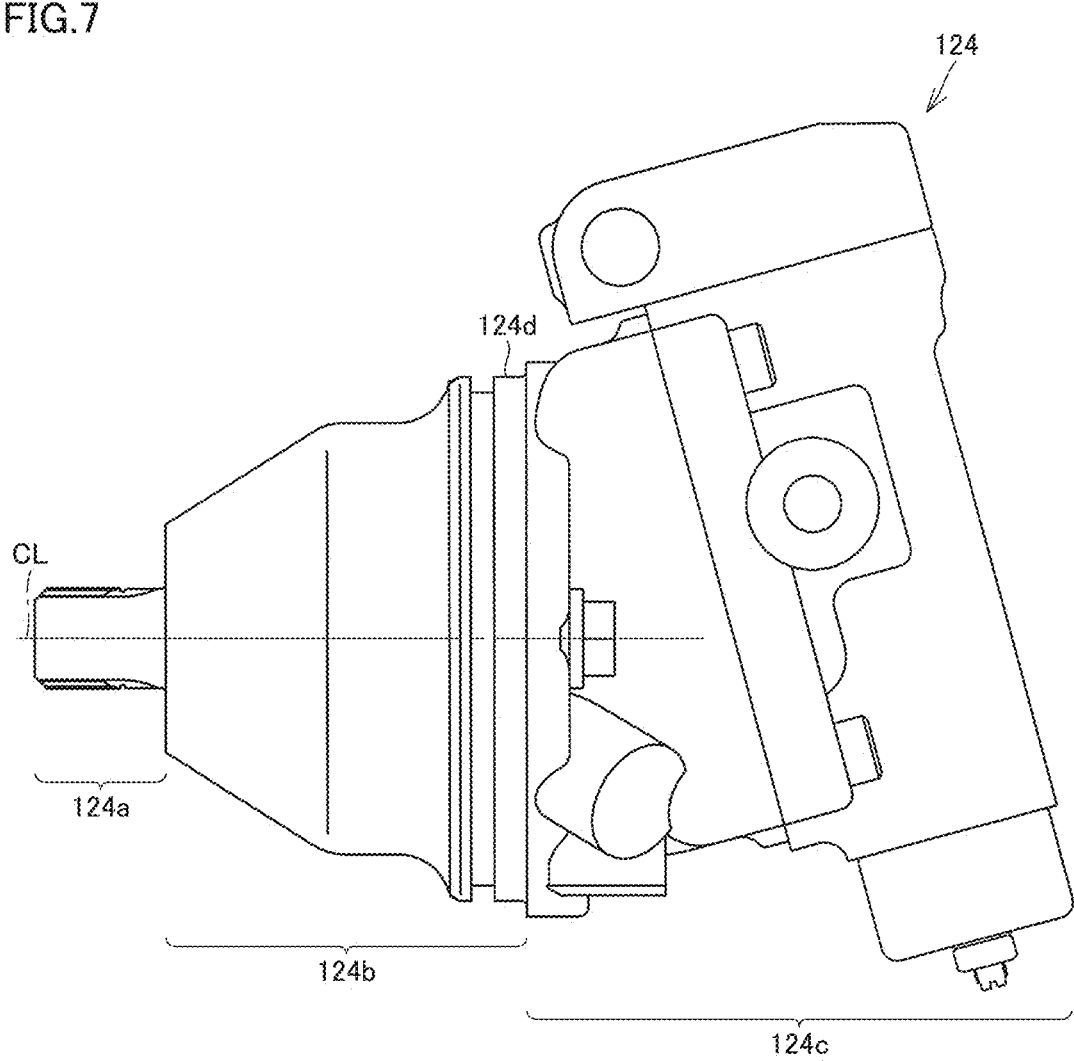
FIG. 7 is a side view showing a schematic configuration of a hydraulic motor.

FIG. 7 is a side view showing a schematic configuration of hydraulic motor 124. As shown in FIG. 7, hydraulic motor 124 includes an output shaft 124a, a main body 124b, and a cylinder housing 124c.

Output shaft 124a protrudes from main body 124b to the vehicle-body outer side. Output shaft 124a is coupled to the drive shaft housed in main body 124b and is supported by main body 124b. At least a part of a cylinder block provided rotatably together with the drive shaft is housed in cylinder housing 124c. The cylinder block is inclined relative to the drive shaft.

When hydraulic motor 124 is driven, pressure oil is supplied to the cylinder block and the piston makes a reciprocating motion relative to a cylinder hole. This causes the cylinder block to rotate and causes the drive shaft to rotate together with the cylinder block. The rotative force is taken from output shaft 124a as motor output.

Main body 124b is axisymmetric in shape with respect to central line CL. Main body 124b has a maximum outer diameter portion 124d where the outer diameter is the largest. In the axial direction along central line CL, maximum outer diameter portion 124d is disposed at the end of main body 124b where main body 124b is connected to cylinder housing 124c.

Next, the effects of the present embodiment are described.

As shown in FIG. 4, power train 125 of the present embodiment includes hydraulic motor 124, motor housing 140, rotatable housing 144, and wheel bearings 142, 143. Hydraulic motor 124 includes rotatable output shaft 124a. Motor housing 140 houses hydraulic motor 124. Rotatable housing 144 is rotatable relative to motor housing 140 about central line CL representing the center of rotation of output shaft 124a of hydraulic motor 124. Wheel bearings 142, 143 rotatably support rotatable housing 144 relative to motor housing 140.

Power train 125 further includes first planetary gear reducer 126, second planetary gear reducer 127, and hydraulic clutch mechanism 128. Second planetary gear reducer 127 includes second sun gear 135, second planetary gears 136 engaged with second sun gear 135, and second carrier 137 rotatably supporting second planetary gears 136, as shown in FIG. 5. Hydraulic clutch mechanism 128 permits or prohibits rotation of second carrier 137 about central line CL. Hydraulic clutch mechanism 128 is disposed on the radially inner side relative to wheel bearings 142, 143.

Region A shown in FIG. 4 represents the range in which wheel bearings 142, 143 are disposed in the radial direction. Region B represents the range in which hydraulic clutch mechanism 128 is disposed in the radial direction. Region A is remoter from central line CL than region B is. The shortest distance from central line CL to region B is smaller than that from central line CL to region A. By defining the position of hydraulic clutch mechanism 128 relative to wheel bearings 142, 143 and reducing the diameter of hydraulic clutch mechanism 128, the external dimension of power train 125 in the radial direction can be reduced.

Wheel bearings 142, 143 are disposed at the outer periphery of protrusion 140a of motor housing 140, and hydraulic clutch mechanism 128 is disposed at the inner periphery of protrusion 140a. Thus, fixed plates 172 of hydraulic clutch mechanism 128 can be attached to protrusion 140a as shown in FIG. 6. A clutch housing separated from motor housing 140 is not necessary for attaching fixed plates 172. The elimination of the need for a clutch housing allows for a reduced weight of power train 125.

Since power train 125 of the present embodiment has a simple structure without a clutch housing, the clutch can be simple in structure and can be enhanced in productivity.

Wheel bearings 142, 143 are provided on the radially outer side relative to protrusion 140a of motor housing 140, and hydraulic clutch mechanism 128 is surrounded by bowl-shaped rotatable housing 144. In a state in which the clutch is ON and in which clutch plates 168 are in pressure contact with fixed plates 172, this can minimize an arrangement where rotating objects (which are rotatable with a torque of hydraulic motor 124) and non-rotating objects (which are not rotatable) are adjacent to each other. Therefore, a loss due to a frictional resistance of air between rotating objects and non-rotating objects can be reduced, and power train 125 can be enhanced in power transfer efficiency.

Wheel bearings 142, 143 are disposed on the radially outer side relative to hydraulic clutch mechanism 128, and wheel bearings 142, 143 have an increased diameter. This enhances rigidity of wheel bearings 142, 143, and thus can prevent deformation of rotatable housing 144 when a load is applied to rotatable housing 144. The ability of rotatable housing 144 to provide more stable support can enhance reliability of first planetary gear reducer 126 and second planetary gear reducer 127 housed in rotatable housing 144. In addition, the life of wheel bearings 142, 143 can be prolonged.

Further, as shown in FIG. 4, viewed in the axial direction of output shaft 124a along central line CL, first planetary gear reducer 126 and hydraulic clutch mechanism 128 overlap with each other. A part of first planetary gears 131, first carrier 132, and first ring gear 133 constituting first planetary gear reducer 126 is disposed within region B representing the range in which hydraulic clutch mechanism 128 is disposed in the radial direction. Defining the position of hydraulic clutch mechanism 128 relative to first planetary gear reducer 126 in this way can more reliably provide a structure in which hydraulic clutch mechanism 128 is disposed on the radially inner side relative to wheel bearings 142, 143.

Viewed in the axial direction along central line CL, wheel bearings 142, 143 do not overlap with either of first planetary gear reducer 126 or second planetary gear reducer 127. Wheel bearings 142, 143 are disposed on the radially outer side relative to first planetary gear reducer 126 and second planetary gear reducer 127. First planetary gear reducer 126 and second planetary gear reducer 127 are disposed out of region A of FIG. 1, the region A representing the range in which wheel bearings 142, 143 are disposed in the radial direction.

Further, as shown in FIG. 7, hydraulic motor 124 includes output shaft 124a and main body 124b supporting output shaft 124a. As shown in FIG. 4, hydraulic clutch mechanism 128 surrounds main body 124b. Main body 124b of hydraulic motor 124, hydraulic clutch mechanism 128, and wheel bearings 142, 143 overlap with one another in the axial direction along central line CL. Main body 124b, hydraulic clutch mechanism 128, and wheel bearings 142, 143 are disposed in this order from central line CL to the radially outer side. In the radial direction, hydraulic clutch mechanism 128 is disposed between main body 124b of hydraulic motor 124 and wheel bearings 142, 143. This can more reliably provide a structure in which hydraulic clutch mechanism 128 is disposed on the radially inner side relative to wheel bearings 142, 143.

Further, as shown in FIG. 7, main body 124b of hydraulic motor 124 is symmetrical in shape with respect to central line CL. Main body 124b includes maximum outer diameter portion 124d where the outer diameter is the largest. As shown in FIG. 4, the inner diameter of hydraulic clutch mechanism 128 is smaller than the outer diameter of maximum outer diameter portion 124d. The outer periphery of maximum outer diameter portion 124d is disposed within region B shown in FIG. 4. Disposing hydraulic clutch mechanism 128 closer to hydraulic motor 124 and reducing the inner diameter of hydraulic clutch mechanism 128 can more reliably provide a structure in which hydraulic clutch mechanism 128 is disposed on the radially inner side relative to wheel bearings 142, 143.

Further, as shown in FIG. 6, hydraulic clutch mechanism 128 includes clutch plates 168 and fixed plates 172. Clutch plates 168 and fixed plates 172 are alternately disposed in the axial direction along central line CL. Fixed plates 172 are attached to protrusion 140a of motor housing 140. This allows for a simple structure of power train 125 without the need for a clutch housing, and thus can reliably achieve reduction in size and weight of power train 125.

Further, as shown in FIG. 4, power train 125 further includes input shaft 150. Input shaft 150 is coupled to output shaft 124a of hydraulic motor 124 to input a torque from hydraulic motor 124 to first sun gear 130. In the axial direction along central line CL, hydraulic clutch mechanism 128 is disposed closer to hydraulic motor 124 than input shaft 150 is. Input shaft 150 may be integrated with first sun gear 130. Alternatively, input shaft 150 may be coupled to first sun gear 130.

Region C shown in FIG. 4 represents the range in which clutch plates 168 and fixed plates 172 are disposed in the axial direction. Region D represents the range in which input shaft 150 is disposed in the axial direction. Output shaft 124a of hydraulic motor 124 is disposed on the vehicle-body inner side relative to region D (on the right side in FIG. 4), the output shaft 124a protruding from main body 124b to the vehicle-body outer side. Hydraulic clutch mechanism 128 surrounds main body 124b of hydraulic motor 124. Therefore, hydraulic clutch mechanism 128 is disposed closer to hydraulic motor 124 than input shaft 150 is.

Defining the position of hydraulic clutch mechanism 128 relative to input shaft 150 in this way allows for a reduced external dimension of power train 125 in the axial direction along central line CL. Hydraulic clutch mechanism 128 does not interfere with first and second planetary gear reducers 126, 127 provided at the outer periphery of input shaft 150. Therefore, first ring gear 133 and second ring gear 138 can be formed to have the same diameter, and the overall structure of first and second planetary gear reducers 126, 127 can be reduced in outer diameter. Thus, power train 125 can be reduced in weight.

Motor grader 1 of the present embodiment includes left front wheel 2 and right front wheel 3 as shown in FIGS. 1 and 2. Motor grader 1 also includes power train 125 shown in FIG. 4 configured to transfer power to left front wheel 2 and right front wheel 3. Thus, left front wheel 2 and right front wheel 3 of motor grader 1 can be reduced in weight.

It should be understood that the embodiment disclosed herein is illustrative in every respect, not limitative. It is intended that the scope of the present invention is defined not based on the above description but based on the claims and includes any modification within the meaning and scope equivalent to the scope of the claims.

REFERENCE SIGNS LIST

1: motor grader; 2: left front wheel; 3: right front wheel; 4, 5: rear wheel; 6: engine; 7: hydraulic system; 12: all-wheel drive device; 13: hydraulic pump; 14: left hydraulic motor; 15: right hydraulic motor; 50: blade; 51: front frame; 52: rear frame; 124: hydraulic motor; 124a: output shaft; 124b: main body; 124c: cylinder housing; 124d: maximum outer diameter portion; 125: power train; 126: first planetary gear reducer; 127: second planetary gear reducer; 128: hydraulic clutch mechanism; 130: first sun gear; 131: first planetary gear; 132: first carrier; 132a, 137a: coupling ring; 133: first ring gear; 135: second sun gear; 135a: hole; 136: second planetary gear; 137: second carrier; 138: second ring gear; 139: fixation housing; 140: motor housing; 140a: protrusion; 142, 143: wheel bearing; 144: rotatable housing; 150: input shaft; 167: clutch input portion; 168: clutch plate; 169, 174: engagement portion; 171: pressure plate; 172: fixed plate; 173: piston; 180: ring-shaped plate; 182: ball bearing; 185: supply port.

The invention claimed is:

1. A power train comprising:
   a hydraulic motor including a rotatable output shaft;
   a motor housing housing the hydraulic motor;
   a rotatable housing rotatable relative to the motor housing about a center of rotation of the output shaft;
   a bearing rotatably supporting the rotatable housing relative to the motor housing;
   a first planetary gear reducer including:
      a first sun gear to which a torque is input from the hydraulic motor,
      a plurality of first planetary gears engaged with the first sun gear,
      a first carrier rotatably supporting the plurality of first planetary gears, and a first ring gear provided in the rotatable housing, the first ring gear being engaged with the plurality of first planetary gears;
a second planetary gear reducer including:
a second sun gear coupled to the first carrier,
a plurality of second planetary gears engaged with the second sun gear,
a second carrier rotatably supporting the plurality of second planetary gears, and
a second ring gear provided in the rotatable housing, the second ring gear being engaged with the plurality of second planetary gears; and
a clutch disposed on a radially inner side relative to the bearing and configured to permit or prohibit rotation of the second carrier about the center of rotation of the output shaft, wherein
the hydraulic motor includes a main body supporting the output shaft, and
the clutch surrounds the main body.

2. The power train according to claim 1, wherein, viewed in an axial direction of the output shaft, the first planetary gear reducer and the clutch overlap with each other.

3. The power train according to claim 1, wherein
the main body is symmetrical in shape with respect to the center of rotation of the output shaft, and
an inner diameter of the clutch is smaller than a maximum diameter of the main body.

4. The power train according to claim 1, wherein
the clutch includes clutch plates and fixed plates alternately disposed in an axial direction of the output shaft, and
the fixed plates are attached to the motor housing.

5. A motor grader comprising:
front wheels; and
the power train according to claim 1 configured to transfer power to the front wheels.

6. A power train comprising:
a hydraulic motor including a rotatable output shaft;
a motor housing housing the hydraulic motor;
a rotatable housing rotatable relative to the motor housing about a center of rotation of the output shaft;
a bearing rotatably supporting the rotatable housing relative to the motor housing;
a first planetary gear reducer including:
a first sun gear to which a torque is input from the hydraulic motor,
a plurality of first planetary gears engaged with the first sun gear,
a first carrier rotatably supporting the plurality of first planetary gears, and
a first ring gear provided in the rotatable housing, the first ring near being engaged with the plurality of first planetary nears;
a second planetary gear reducer including:
a second sun gear coupled to the first carrier,
a plurality of second planetary gears engaged with the second sun gear,
a second carrier rotatably supporting the plurality of second planetary gears, and
a second ring gear provided in the rotatable housing, the second ring gear being engaged with the plurality of second planetary gears;
a clutch disposed on a radially inner side relative to the bearing and configured to permit or prohibit rotation of the second carrier about the center of rotation of the output shaft; and
an input shaft coupled to the hydraulic motor and configured to input the torque from the hydraulic motor to the first sun gear, wherein
in an axial direction of the output shaft, the clutch is disposed closer to the hydraulic motor than the input shaft is.

* * * * *